June 13, 1939.  C. A. LINDSAY  2,162,622
MOTOR TRUCK SCALE
Filed May 26, 1938  2 Sheets-Sheet 1
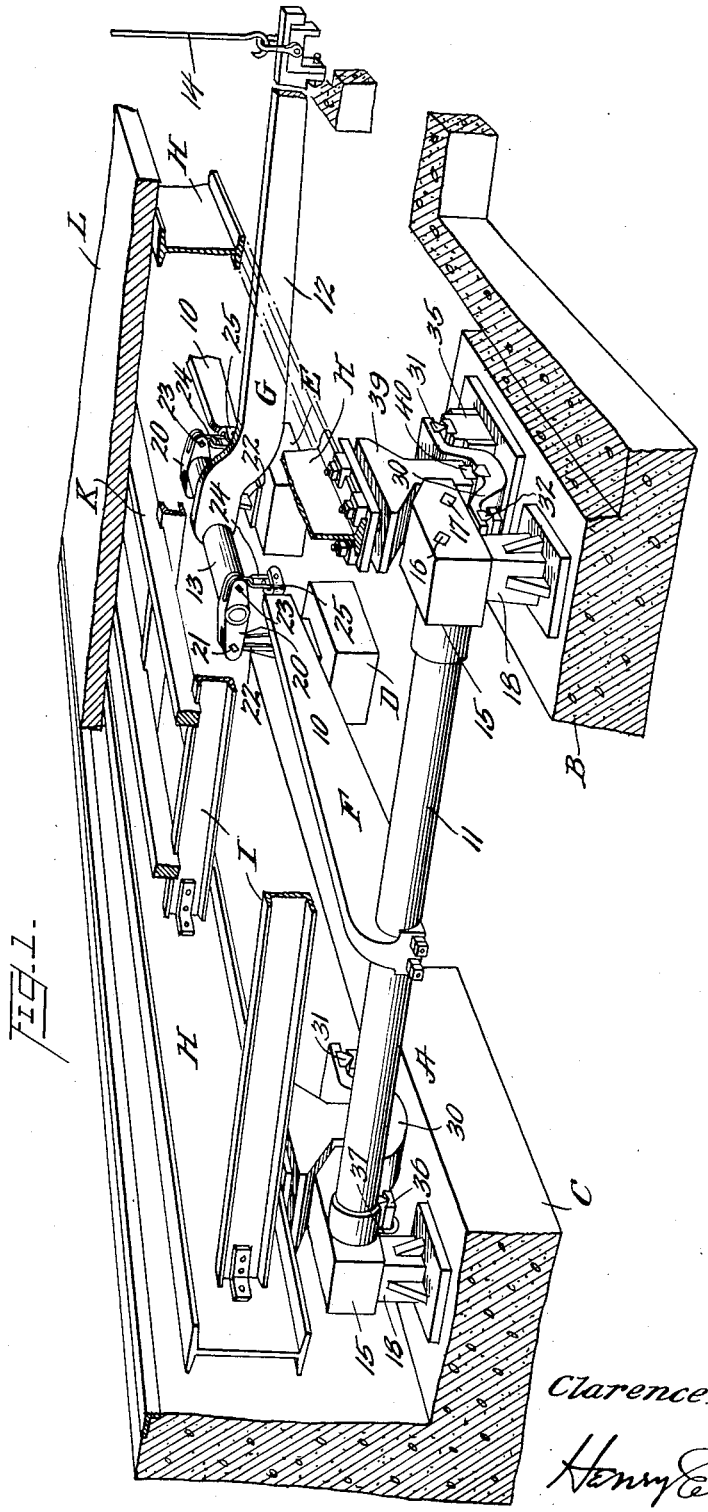
Inventor
Clarence A. Lindsay,
Henry E. Stauffer
His Attorney June 13, 1939.  C. A. LINDSAY  2,162,622
MOTOR TRUCK SCALE
Filed May 26, 1938   2 Sheets-Sheet 2
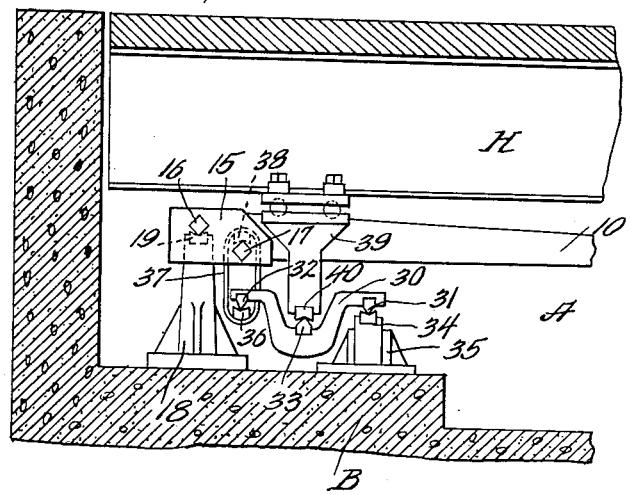
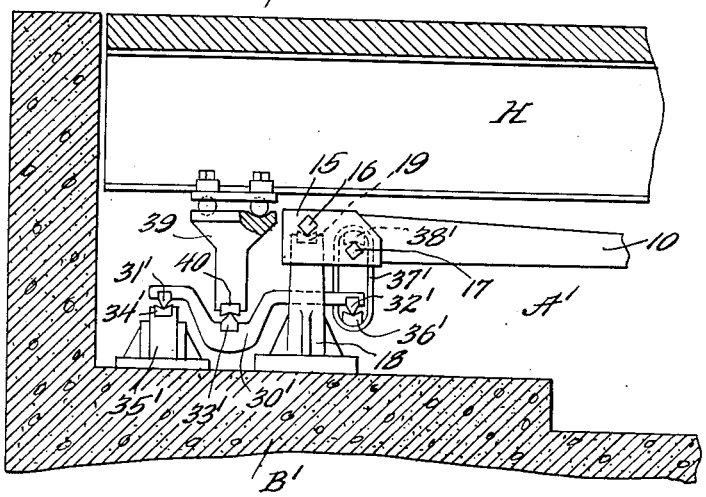
Inventor
Clarence A. Lindsay,
By Henry E. Stauffer
His Attorney Patented June 13, 1939

2,162,622

UNITED STATES PATENT OFFICE 2,162,622

MOTOR TRUCK SCALE

Clarence A. Lindsay, Washington, D. C.

Application May 26, 1938, Serial No. 210,206

11 Claims. (Cl. 265—71)

This invention is in weighing machines generally, but relates more particularly to scales known in the trade as "motor truck scales."

The general use of motor trucks has introduced special problems for the scale manufacture, due to conditions incident to weighing this type of load. As a truck moves onto the weighing platform and is brought to a stop, the force due to the movement of the mass causes the platform to shift in the direction of movement of the truck; and as the truck moves off the scale, the turning of the driving wheels shifts the platform in the opposite direction; as the front wheels reach the ground, the reaction of the driving wheels on the platform is pronounced. These movements are transmitted to the bearings and pivots of the scale, and produce undue wear of these elements.

Two lever systems are in common use in platform scales. In one system, the end levers consist essentially of triangular levers, the fulcrum and load pivots being at the ends of the base of the triangle and in line therewith. This lever is made in many forms, and embodies what is known as the "torsion" principle of design, because of the stresses set up along the base of the lever, which is commonly tubular in form. In the other system, the levers are straight elements, and scales built of these levers are said to be constructed on the "straight" principle of design, known to the trade as "railroad" pattern.

Each of these two lever systems has advantages and disadvantages not found in the other. The first form of lever system, that embodying the "triangular" or "torsion" lever, is simpler in design, and the pivots are all set transversely to the line of movement of the load, thereby avoiding undue wear; but such levers have a single nose pivot at the apex of the triangle with fulcrum and load pivots at each end of the base of the triangle, and therefore adjustment of the nose pivot can not correct any difference in errors in the two corners of the base of the lever. The second form of lever system, that which uses all "straight" levers, has the objection that it is more complex in its construction; and, further, that the knife edges lie in the line of movement of the load and therefore are subject to undue wear, because the shifting of the platform causes the load bearings to slide upon the knife edges. But the "straight" lever system provides a separate lever for each corner, and makes it possible to separately adjust the corners of the scale.

The principal object of this invention is to so combine the elements of these two lever systems as to secure the advantages, and avoid the disadvantages, of both; to so combine the two lever systems as to secure the advantages of stability and simplicity, with the transverse bearings of the "torsion" design; and to secure the advantage of individual corner adjustment of the "straight" lever design, but with pivots and bearings of the individual straight levers transverse rather than parallel to the direction of the movement of the load over the platform of the scale.

Another object of the invention is to increase or decrease the weighing capacity of a scale already in service.

A still further object is to increase or decrease the length of the platform of a scale already in service.

An additional object is to stabilize a scale lever system for closer weighing and more constant weight indications.

Fig. 1 is a perspective view of a scale embodying the "triangle" or "torsion" principle of design, with my invention incorporated therein, parts being broken away.

Fig. 2 is a side elevation of one corner of a scale of the above mentioned type, showing in more detail my invention applied thereto.

Fig. 3 is a similar view, but with my invention so placed as to increase the effective length of the scale.

Referring to the drawings, and particularly to Fig. 1, A represents a scale pit with a standard torsion lever scale therein, the elements being supported on suitable piers, as B, C, D and E. Scales of the type here illustrated comprise three principal levers; namely, a lever F, comprising an arm 10 and a transverse member 11, the parts either being made integral, or being rigidly secured together to constitute in effect a single element. An identical lever at the other end of the scale does not appear in the drawings, a part of the arm 10 only being shown. The third or center lever G is of substantially the same design, comprising an arm 12, and a transverse member 13. A rod 14 secured to the end of the arm 12 connects the lever system to the weigh beam of the scale, not shown.

The transverse member 11 of the lever F has at either end an enlarged box or frame 15, in which are secured the fulcrum pivot 16 and the companion load pivot 17, best shown in Figs. 2 and 3. The box or frame, and the fulcrum and load pivots, are to be understood as being duplicated at the other end of the member 11. The lever F is duplicated in all particulars at the other end of the scale, but only the end of the arm 10 is shown, the remainder of the lever being broken away.

A pedestal 18, resting on the pier B, carries a hardened bearing 19, which serves as a rest for the fulcrum pivot 16. A duplicate pedestal 18 at the other end of the member 11, and resting on the pier C, carries a hardened bearing which supports a corresponding fulcrum pivot at this end of the member. These pedestals, pivots and other parts are duplicated at the other end of the scale.

As stated before, the main levers F, one at either end of the scale, together actuate the intermediate lever G, which transmits movement to the scale beam (not shown). Rigidly secured to the transverse member 13 of lever G are members 20, each having at one end thereof a fulcrum pivot 21 by which the lever is supported on fulcrum stands 22, and at the other end, a load pivot 23. Shackles 24, one at either side, connect these pivots 23 with the nose pivots 25 of the arms 10, so that all movements of the arms 10 are transmitted to lever G through these connections. All of this is standard construction, and needs no further explanation. The platform of the scale comprises the beams H, cross beams I, stringers K and floor L. This also is normal construction, and does not need to be further described.

Referring now more particularly to Fig. 2 of the drawings, my improvement will be described in detail, it being understood that the construction here shown is to be duplicated at each of the four corners of the scale.

Cooperating with the standard torsion lever system already described, I provide at each corner of the scale an additional lever 30, having at one end a fulcrum pivot 31; at the other end, a nose pivot 32, the purpose of which will presently be described; and between them a load pivot 33. As here shown, this is a second class lever, with an effective ratio of 1 to 2; but it is to be understood that any suitable lever, of any desired ratio may be used. The fulcrum pivot 31 of this lever rests on a hardened bearing 34, suitably supported in a pedestal 35, which in turn rests on pier B or some equivalent thereof. The pivot 32 at the other end of the lever 30 rests on a bearing 36 in a shackle 37, which in turn carries a second bearing 38 resting on the top of the load pivot 17 of the main lever F. A suitable support 39, attached to and carried by the platform, carries a hardened bearing 40, which rests on the pivot 33 of the lever 30.

This lever 30 is a so-called "straight" lever; that is, it is a simple beam, with all of its pivots arranged transversely of the length of the lever itself.

Since this lever construction is duplicated at all four corners of the scale, all of the several pivots 17, which before received the load directly, now support the ends of the levers 30, which levers in turn support the load.

In the form here shown, these levers 30 increase the load capacity of the scale; but it is to be understood that these levers may be of any other class, or may have any other desired ratios. The important point is that their pivots and bearings are all transverse to the direction of the normal movement of the load.

Further, any adjustment of the lever system can be effected by merely adjusting either of the pivots 31, 32, with relation to other pivots of the lever system; and since there is to be one such lever at each corner of the scale, each corner may be effectively adjusted independently of the others.

It is sometimes desirable to lengthen the platform of the scale without changing the length of scale parts in service. My invention adapts itself readily to that purpose, while at the same time retaining the several advantages of the "straight" lever above set forth. In Fig. 3, the lever 30' is the same as the lever 30 of Fig. 2, but reversed in position. In as much as many of the parts and features of this figure are the same as those of Fig. 2, the reference characters employed in describing Fig. 2 will be used as far as practicable in describing the corresponding parts of this form of the invention.

The pit A of the scale proper is here extended into a supplemental pit A'; and the pedestal 35 of Fig. 2 is, in the construction of Fig. 3, moved outside the original pit, and is designated 35', resting on supplemental pier B'.

The box or frame 15, and the fulcrum and load pivots 16 and 17, are the same identical elements as the parts designated by these characters in Fig. 2. The lever here designated 30' corresponds to the lever 30 of Fig. 2. Here it is reversed; that is, with its fulcrum in the pit extension A', instead of in the pit proper A, and is somewhat longer than the lever 30 of Fig. 2. The questions of length and ratios of the elements are, however, as noted above, matters of choice and expediency.

The form of Fig. 3 accommodates a platform longer than can be accommodated by the lever mechanism of Figs. 1 and 2. And this lengthened platform may be either a new and longer platform or an existing platform lengthened in any practicable manner. The supporting members 39 of course must be secured to the platform in such position as to rest on the pivots 33' of the lever 30'.

In the form of invention shown in Fig. 3, it is to be understood of course that the levers 30' and their cooperating elements, like the levers 30 and their associated elements, are to be placed one at each corner of the scale; and the platform is to be of the proper length to rest upon these levers 30'.

The constructions here described are merely illustrative of mechanisms which may be used to accomplish the objects of my invention, but it will be understood that I am not in any way to be limited thereto.

I claim:

1. In a weighing scale, the combination of a load receiving platform, a lever system including triangular levers one at either end of the scale and each having fulcrum and load pivots arranged transversely to the movement of the load, additional levers one for each corner of the scale having fulcrum and load pivots arranged transversely to the movement of the load, and means for transmitting movement of the additional levers to the load pivots of the triangular levers.

2. In a weighing scale, the combination of a load receiving platform, a lever system including triangular levers one at either end of the scale and each having fulcrum and load pivots arranged transversely to the movement of the load, additional straight levers one for each corner of the scale having fulcrum and load pivots arranged transversely to the movement of the load, and means for transmitting movement of the additional straight levers to the load pivots of the triangular levers.

3. In a weighing scale, the combination of a lever system including triangular levers having their fulcrum pivots and their load pivots arranged transversely to the direction of movement of the load, and additional levers one for each corner of the scale mounted in line with the direction of movement of the load and each having a free end and fulcrum and load pivots said pivots being arranged transversely to the movement of the load, and means for operatively connecting the free ends of the additional levers to the load pivots of the triangular levers.

4. In a weighing scale, the combination of a load receiving platform, a lever system including triangular levers one at either end of the scale and each having fulcrum and load pivots arranged transversely to the line of movement of the load, additional levers one for each corner of the scale each having a free end and fulcrum and load pivots arranged transversely to the normal movement of the load on and off the platform, and shackles supporting the free ends of the additional corner levers on the load pivots of the cooperating triangular levers.

5. In a weighing scale, the combination of a lever system including triangular levers having their fulcrum pivots and load pivots arranged transversely to the normal direction of movement of the load, and additional levers one for each corner of the scale mounted in line with the direction of movement of the load with their pivots arranged transversely to the path of movement of the load and fulcrumed on fixed supports and shackled to the load pivots of the triangular levers.

6. In a weighing scale, the combination of a platform, a lever system including triangular levers one at each end of the platform having fulcrum and load pivots on the levers arranged transversely to the direction of movement of the load, and additional levers one at each corner of the platform positioned parallel with the direction of normal movement of the load, each having a free end and fulcrum and load pivots arranged transversely to the movement of the load, fulcrum stands one for each additional corner lever, means for supporting the free ends of the said additional corner levers on the load pivots of the triangular levers, and means for supporting the platform and load on the load pivots of the additional corner levers.

7. In a weighing scale, the combination of a load receiving platform, a lever system including triangular levers one at each end of the scale and each having fulcrum and load pivots, additional levers one for each corner of the scale each having fulcrum and load pivots, fulcrum stands one for each additional lever, means for supporting the platform on the load pivots of these additional levers, and means for transmitting movement of the additional levers to the load pivots of the triangular levers.

8. In a weighing scale, the combination of a platform, a main lever system including triangular levers having load pivots and fulcrum pivots, said levers being mounted one at either end of the scale with all pivots arranged transversely to the normal movement of the load, and additional levers one at each corner of the scale arranged parallel to the normal line of movement of the load, each additional corner lever having fulcrum and load pivots and a free end, fulcrum stands one for each of the additional corner levers, means for supporting the free ends of the additional corner levers on the load pivots of the triangular levers, and platform pivots on the additional corner levers.

9. In a weighing scale, the combination of a platform, a main lever system including trilar levers having load pivots and fulcrum pivots, said levers being mounted one at either end of the scale with all pivots arranged transversely to the normal movement of the load, and additional levers one at each corner of the scale arranged parallel to the normal line of movement of the load and beneath the triangular levers, said additional corner levers each having a free end and fulcrum and load pivots, fulcrum stands one for each of the additional corner levers, means for supporting the free ends of the additional corner levers on the load pivots of the triangular levers, and platform pivots on the additional corner levers.

10. In a weighing scale, the combination of a platform, a main lever system including triangular levers having load pivots and fulcrum pivots, said levers being mounted one at either end of the scale with all pivots arranged transversely to the normal movement of the load, and additional levers one at each corner of the scale arranged parallel to the normal line of movement of the load and beyond the triangular levers, each additional corner lever having fulcrum and load pivots and a free end, fulcrum stands one for each of the additional corner levers, means for supporting the free ends of the additional corner levers on the load pivots of the triangular levers, and platform pivots on the additional corner levers.

11. In a weighing scale, the combination of a platform, a main lever system including triangular levers having load pivots and fulcrum pivots, said levers being mounted one at either end of the scale with all pivots arranged transversely to the normal movement of the load, and additional straight levers beyond the triangular levers and in line with the direction of normal movement of the load one at each corner of the scale, each additional straight lever having fulcrum and load pivots and a free end, fulcrum stands beyond the triangular levers one for each of the additional straight levers, means for supporting the free ends of the additional straight levers on the load pivots of the triangular levers, and platform pivots resting on the additional straight levers.

CLARENCE A. LINDSAY.